(12) United States Patent
Bogli et al.

(10) Patent No.: US 10,578,639 B2
(45) Date of Patent: Mar. 3, 2020

(54) HYBRID ALTIMETER FOR MEASURING VERTICAL VELOCITY

(71) Applicant: Otis Elevator Company, Farmington, CT (US)

(72) Inventors: Craig Drew Bogli, Avon, CT (US); Daryl J. Marvin, Farmington, CT (US); Benjamin J. Watson, Collinsville, CT (US); Arthur T. Grondine, Deep River, CT (US); Marcin Wroblewski, Burlington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 149 days.

(21) Appl. No.: 15/688,188

(22) Filed: Aug. 28, 2017

(65) Prior Publication Data

US 2019/0064199 A1 Feb. 28, 2019

(51) Int. Cl.
*G01P 7/00* (2006.01)
*B66B 1/34* (2006.01)
(Continued)

(52) U.S. Cl.
CPC .............. *G01P 7/00* (2013.01); *B66B 1/3453* (2013.01); *B66B 1/3492* (2013.01);
(Continued)

(58) Field of Classification Search
CPC ....................................................... G01P 7/00
(Continued)

(56) References Cited

U.S. PATENT DOCUMENTS 2,775,122 A * 12/1956 Smith ........................ G01P 3/62
73/179
3,005,348 A * 10/1961 Perkins ..................... G01P 3/62
73/503
(Continued)

FOREIGN PATENT DOCUMENTS

CN 102009883 A 4/2011
CN 104071664 A 10/2014
(Continued)

OTHER PUBLICATIONS

Sabatini, Angleo Maria, et al., "A Sensor Fusion Method for Tracking Vertical Velocity and Height Based on Intertial and Barometric Altimeter Measurements", Sensors, 2014, ISSN 1424-8220, 24 pages. (Year: 2014).*

(Continued)

*Primary Examiner* — Hien D Khuu
(74) *Attorney, Agent, or Firm* — Cantor Colburn LLP

(57) ABSTRACT

An electronic speed detection system is provided. The electronic speed detection system includes an accelerometer coupled to a moving object and a hybrid altimeter, which includes a first pressure sensor coupled to the moving object and a second pressure sensor. The electronic speed detection system also includes a controller comprising a memory and a processor. The memory storing computer program instructions executable by the processor to cause the electronic speed detection system to determine a normalized position based on first inputs received from the hybrid altimeter, or determine a corrected velocity position based on a second input received from the accelerometer and the normalized position.

16 Claims, 3 Drawing Sheets

(51) Int. Cl.
*B66B 5/00* (2006.01)
*G01C 21/16* (2006.01)
*G01C 5/06* (2006.01)

(52) U.S. Cl.
CPC .............. *B66B 5/0037* (2013.01); *G01C 5/06* (2013.01); *G01C 21/16* (2013.01)

(58) Field of Classification Search
USPC .......................................................... 702/96
See application file for complete search history.

(56) References Cited

U.S. PATENT DOCUMENTS

| | | | | |
|---|---|---|---|---|
| 3,054,051 | A | * | 9/1962 | Hayes ........................ G01P 3/62 333/19 |
| 7,484,598 | B2 | | 2/2009 | Tyni et al. |
| 8,327,553 | B2 | | 12/2012 | Matzker et al. |
| 9,322,648 | B1 | | 4/2016 | Karvounis et al. |
| 2010/0088908 | A1 | * | 4/2010 | Matzker ................ B66B 1/3492 33/282 |
| 2014/0312884 | A1 | | 10/2014 | Reilio et al. |
| 2015/0127296 | A1 | | 5/2015 | Rémi et al. |
| 2015/0284214 | A1 | | 10/2015 | Park et al. |
| 2015/0313552 | A1 | * | 11/2015 | Zhang ................... A61B 5/1117 600/595 |
| 2015/0321879 | A1 | | 11/2015 | Martin |
| 2016/0091309 | A1 | | 3/2016 | Sasaki |
| 2017/0029244 | A1 | | 2/2017 | Madarasz et al. |

FOREIGN PATENT DOCUMENTS

| | | | |
|---|---|---|---|
| CN | 104787635 A | | 7/2015 |
| DE | 2813078 B1 | | 4/1979 |
| JP | 2004-359434 | * | 12/2004 |
| WO | 2017/092006 | * | 6/2017 |
| WO | 2017092006 A1 | | 6/2017 |

OTHER PUBLICATIONS

Monteiro, Martin et al., "Using smartphone pressure sensors to measure vertical velocities of elevators, stairways, and drones," 2005, 13 pages, obtained from: https://arxiv.org/pdf/1607.00363.pdf.
Sabatini, Angelo Maria et al., "A Sensor Fusion Method for Tracking Vertical Velocity and Height Based on Inertial and Barometric Altimeter Measurements," Sensors, 2014, vol. 14, pp. 13324-13347.
European Search Report for application EP18190589, dated Jan. 17, 2019, U320967EP, 34 pages.
Sabatini, Angleo Maria, et al., "A Sensor Fusion Method for Tracking Vertical Velocity and Height Based on Intertial and Barometric Altimeter Measurements", Sensors, 2014, ISSN 1424-8220, 24 pages.

* cited by examiner

HYBRID ALTIMETER FOR MEASURING VERTICAL VELOCITY

BACKGROUND

In contemporary elevator systems, accelerometers are utilized to determine a velocity of an elevator. However, present accelerometers include offset/error issues that result in velocity calculations to drift over time.

BRIEF DESCRIPTION

In accordance with one or more embodiments, an electronic speed detection system is provided. The electronic speed detection system comprises an accelerometer coupled to a moving object; a hybrid altimeter comprising a first pressure sensor coupled to the moving object and a second pressure sensor; and a controller comprising a memory and a processor, the memory storing computer program instructions executable by the processor to cause the electronic speed detection system to: determine a normalized position based on first inputs received from the hybrid altimeter, or determine a corrected velocity position based on a second input received from the accelerometer and the normalized position.

In accordance with one or more embodiments or the electronic speed detection system embodiment above, the second input can comprise first and second atmospheric pressures detected by the first and second pressure sensors, respectively, and provided as sensor signals by the first and second pressure sensors to the controller.

In accordance with one or more embodiments or any of the electronic speed detection system embodiments above, the normalized position can be determined by the controller according to NP=$f$(PS # B, PS # A), where PS # A is the first atmospheric pressure provided by the first pressure sensor, PS # B is the second atmospheric pressure provided by the second pressure sensor, and NP is the normalized position of the moving object In accordance with one or more embodiments or any of the electronic speed detection system embodiments above, the normalized position can be determined based on the difference between the first and second atmospheric pressures to remove disturbances or influences external to the moving object.

In accordance with one or more embodiments or any of the electronic speed detection system embodiments above, the second pressure sensor can be located at a fixed location within a hoistway of the moving object.

In accordance with one or more embodiments or any of the electronic speed detection system embodiments above, the first inputs can comprise an acceleration of the moving object detected by the accelerometer and provided as a sensor signal by the accelerometer to the controller.

In accordance with one or more embodiments or any of the electronic speed detection system embodiments above, the corrected velocity can be determined by the controller according to CV=$f$(A, NP), where A is the acceleration, NP is the normalized position, and CV is the corrected velocity of the moving object.

In accordance with one or more embodiments or any of the electronic speed detection system embodiments above, the computer program instructions can be executable by the processor to cause the electronic speed detection system to apply the corrected velocity to the moving object to correct for an accelerometer offset of the accelerometer.

In accordance with one or more embodiments or any of the electronic speed detection system embodiments above, the hybrid altimeter can comprise a plurality of second pressure sensors, each of the plurality of second pressure sensors is located at a separate fixed location within a hoistway of the moving object, and each of the plurality of second pressure sensors provides atmospheric pressures corresponding to those separate fixed locations.

In accordance with one or more embodiments or any of the electronic speed detection system embodiments above, the program instructions executable by the processor to cause the electronic speed detection system to: determine a normalized position based on first inputs received from the hybrid altimeter, and determine a corrected velocity position based on a second input received from the accelerometer and the normalized position.

In accordance with one or more embodiments, a computer-implemented method for electronic speed detection of a moving object is provided. The computer-implemented method comprises determining, by a controller comprising a memory and a processor, a normalized position based on first inputs received from a hybrid altimeter comprising a first pressure sensor coupled to the moving object and a second pressure sensor; or determining, by the controller, a corrected velocity position based on a second input received from an accelerometer coupled to the moving object and the normalized position.

In accordance with one or more embodiments or the computer-implemented method embodiment above, the second input can comprise first and second atmospheric pressures detected by the first and second pressure sensors, respectively, and provided as sensor signals by the first and second pressure sensors to the controller.

In accordance with one or more embodiments or any of the electronic speed detection system embodiments above, the normalized position can be determined by the controller according to NP=$f$(PS # B, PS # A), where PS # A is the first atmospheric pressure provided by the first pressure sensor, PS # B is the second atmospheric pressure provided by the second pressure sensor, and NP is the normalized position of the moving object In accordance with one or more embodiments or any of the computer-implemented method embodiments above, the normalized position can be determined based on the difference between the first and second atmospheric pressures to remove disturbances or influences external to the moving object.

In accordance with one or more embodiments or any of the computer-implemented method embodiments above, the second pressure sensor can be located at a fixed location within a hoistway of the moving object.

In accordance with one or more embodiments or any of the computer-implemented method embodiments above, the first inputs can comprise an acceleration of the moving object detected by the accelerometer and provided as a sensor signal by the accelerometer to the controller.

In accordance with one or more embodiments or any of the computer-implemented method embodiments above, the corrected velocity can be determined by the controller according to CV=$f$(A, NP), where A is the acceleration, NP is the normalized position, and CV is the corrected velocity of the moving object.

In accordance with one or more embodiments or any of the computer-implemented method embodiments above, the computer-implemented method can comprise applying the corrected velocity to the moving object to correct for an accelerometer offset of the accelerometer.

In accordance with one or more embodiments or any of the computer-implemented method embodiments above, the hybrid altimeter can comprise a plurality of second pressure sensors, each of the plurality of second pressure sensors is located at a separate fixed location within a hoistway of the moving object, and each of the plurality of second pressure sensors provides atmospheric pressures corresponding to those separate fixed locations.

In accordance with one or more embodiments or any of the computer-implemented method embodiments above, the controller determines the normalized position and the corrected velocity position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
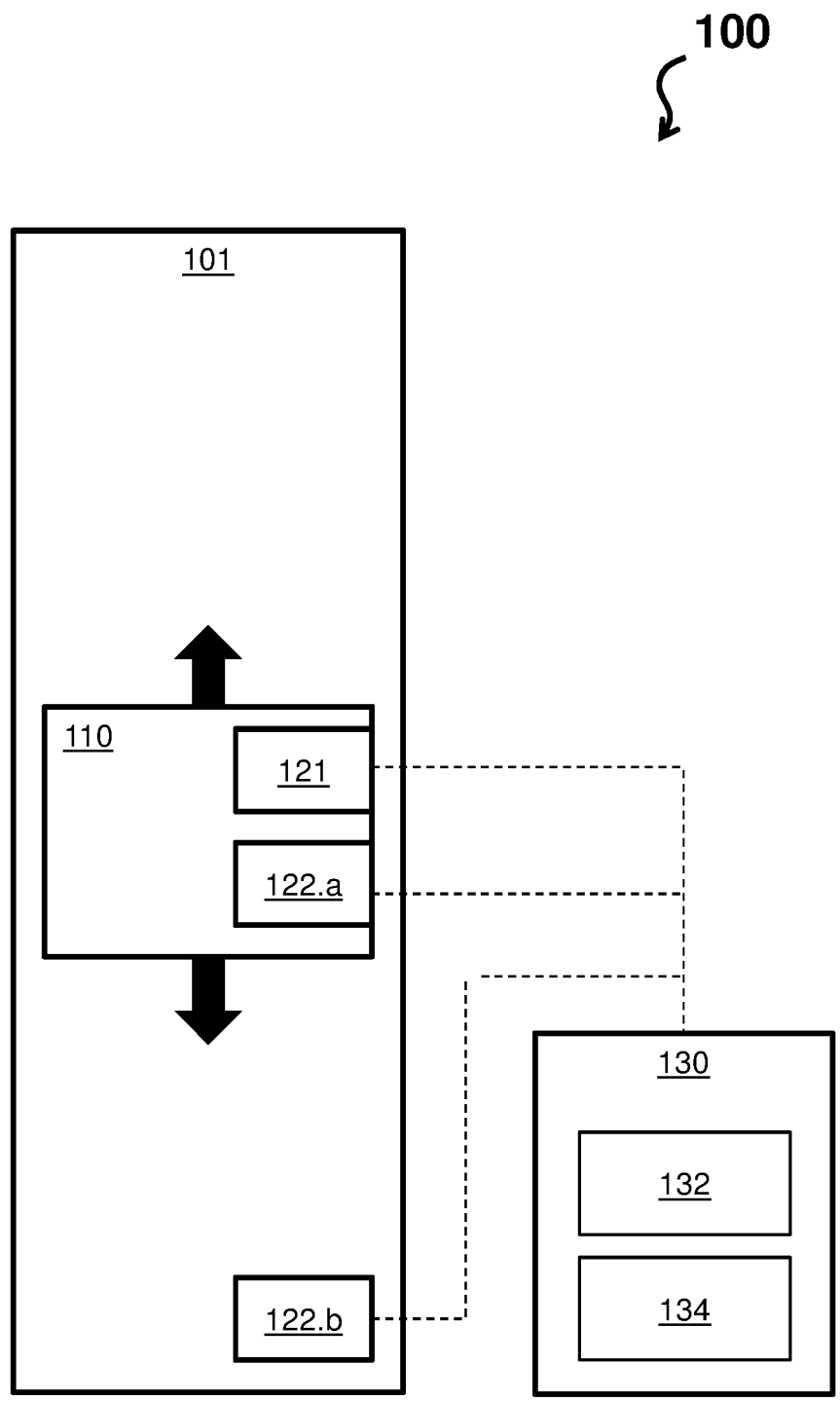
FIG. 1 depicts an electronic speed detection system in accordance with one or more embodiments.

Embodiments disclosed herein may include an electronic speed detection system, method, and/or computer program product (herein electronic speed detection system) that measures velocity by correcting errors due to an accelerometer's drift. FIG. 1 depicts an electronic speed detection system 100 in accordance with one or more embodiments. The electronic speed detection system 100 can comprise a common pressure environment 101, a moving object 110, one or more sensors 121 and 122, a controller 130, a processor 132, and a memory 134. Note that each item of FIG. 1 can be representative of one or more of that item such that, for example, the controller 130 can comprise one or more processors 132 and/or one or more memories 134, the electronic speed detection system 100 can comprise one or more moving objects 110 and corresponding sensors 121 and 122, etc.

The common pressure environment 101 can be any facility or any portion therein that includes the moving object 110. Examples of the facility include buildings with multiple floors, high-rise buildings, sky scrapers, boats, cruise ships, parking garages, etc. Examples of a portion within a facility includes a hoistway within any of said buildings, high-rise buildings, sky scrapers, boats, cruise ships, parking garages, etc. The moving object 110 can be a car, a cabin, or an elevator within a hoistway that can move in one or more directions (e.g., a vertical direction as shown by the solid arrows).

The one or more sensors 121 and 122 can be electro-mechanical components that detect events or changes in an environment of the electronic speed detection system 100 (or corresponding components therein). The one or more sensors 121 and 122 output the events or changes as sensor signals to other components of the electronic speed detection system 100 (e.g., the controller 130).

An example of the sensor 121 is an accelerometer (e.g., a micro electro-mechanical systems accelerometer) that detects an acceleration of the moving object 110 as it traverses vertically within a hoistway of the common pressure environment 101. The acceleration of the moving object 110 can be provided as a sensor signal to the controller 130 by the sensor 121, as shown by the dashed-lines connected the sensor 121 to the controller 130. In accordance with another embodiment, the sensor 121 can be inertial guidance device.

An example of the sensors 122 is a pressure sensor that detects an atmospheric pressure at a current sensor location. The pressure sensor can comprise high resolution detectors that distinguish between sensor locations on a centimeter scale. For instance, the pressure sensors can be used to detect a vertical position of the moving object 110 (e.g., a normalized position) based on atmospheric pressures, which in turn can be used to derive velocity. The atmospheric pressure detected by the pressure sensors can be used to correct any offset/error issues of the sensor 121, resulting in an accurate and stable velocity determination for the moving object 110.

As shown, the sensor 122.a can be included in or attached to (e.g., coupled) the moving object 110. For example, the current sensor location of the sensor 122.a changes as the moving object 110 traverses vertically within a hoistway of the common pressure environment 101. As shown, the sensor 122.b can be included within the common pressure environment 101 (e.g., at a fixed location anywhere within the hoistway of the moving object 110 or on a stationary object within a same area of operation as the moving object 110, e.g., a stationary pressure sensor). Note that the sensor 122.b is utilized to subtract out external disturbances or influences (e.g., weather) as further described herein and therefore its location can vary. For example, the current sensor location of the sensor 122.b is fixed within a hoistway of the common pressure environment 101. The atmospheric pressure at each current sensor location can be provided as sensor signals to the controller 130 by the sensors 122, as shown by the dashed-lines connecting the sensors 122 to the controller 130. In this way, the two sensors 122.a and 122.b form a hybrid altimeter that provides two pressure readings at two current sensor locations within sensor signals to the controller 130. Also, note that the sensor 122.b can be representative of a plurality of sensors placed throughout the hoistway.

The controller 130 can reads all sensor signals to generate a corrected velocity using the vertical position to correct for an accelerometer offset error. The controller 130 can be any computing device comprising hardware and/or software for carrying out operations of the electronic speed detection system 100. As shown, the controller 130 can comprise a processor 132 and a memory 134. The processor 132 (also referred to as a processing circuit) can be coupled via a system bus to the memory 134, respectively, and various other components. The memory 134 can include a read only memory (ROM) and a random access memory (RAM). The ROM is coupled to the system bus and may include a basic input/output system (BIOS), which controls certain basic functions of the processor 132 or the electronic speed detection system 100. The RAM is read-write memory coupled to the system bus for use by the processor 132.

Software for execution by the electronic speed detection system 100 may be stored in the memory 134 (e.g., the memory 134 can store operations for determining a corrected velocity). The memory 134 is an example of a tangible storage medium readable by the processor 132, where the software is stored as instructions for execution by the processor 132 to cause the electronic speed detection system 100 to operate, such as is described herein with reference to FIG. 2. Examples of computer program product and the execution of such instruction is discussed herein in more detail.

Figure 2:
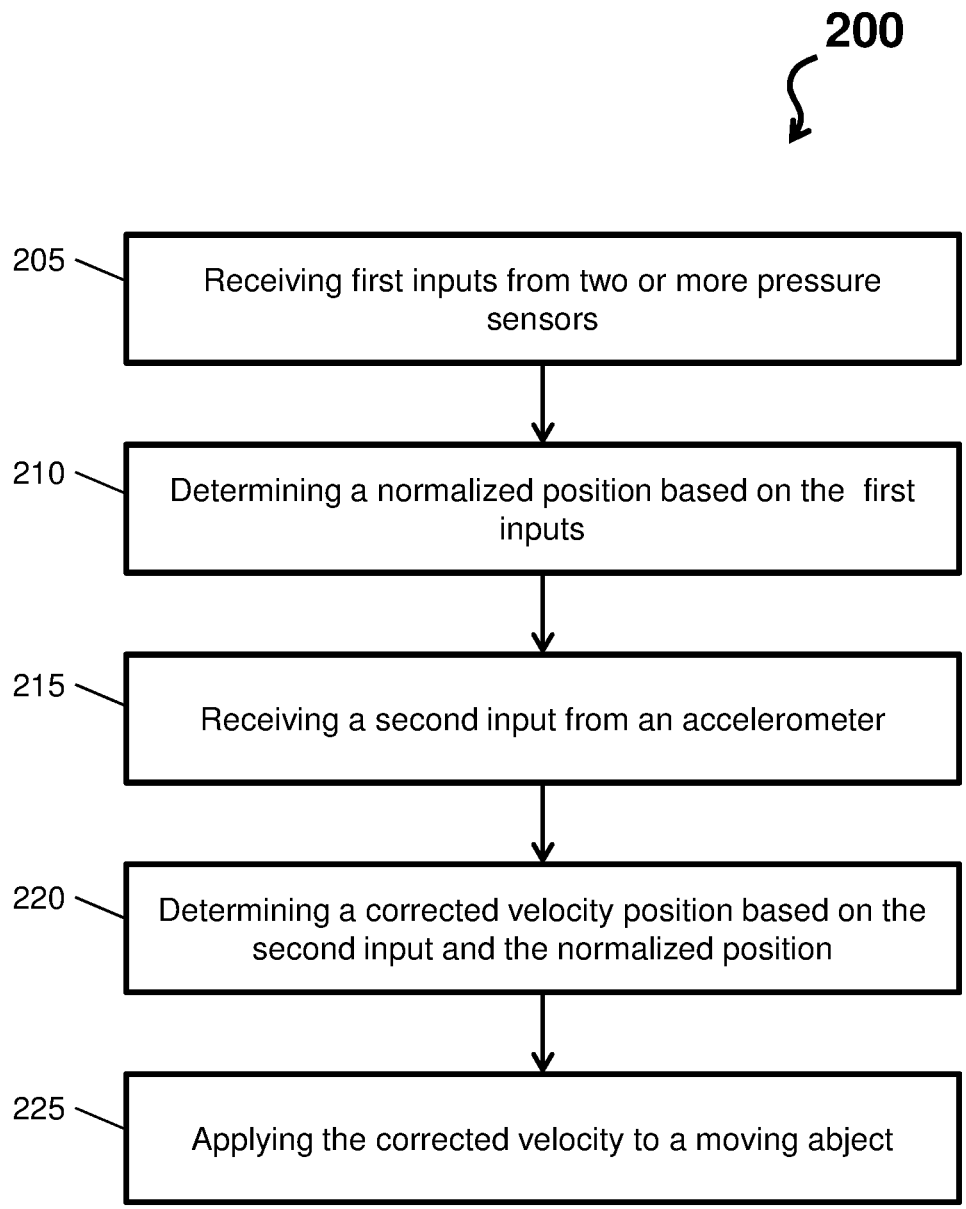
FIG. 2 depicts a process flow of an electronic speed detection system in accordance with one or more embodiments.

Turning now to FIG. 2, operations of the electronic speed detection system 100 is described in accordance with one or more embodiments. FIG. 2 depicts a process flow 200 where the controller 130 utilizes the sensor signals from the one or more sensors 121 and 122 to determine a corrected velocity of the moving object 110.

The process flow 200 begins at block 205 where the controller 130 receives first inputs from two or more pressure sensors (e.g., sensors 122.a and 122.b). The first inputs comprise sensor signals indicating the atmospheric pressures at the current sensor locations of the two or more pressure sensors.

At block 210, the controller 130 determines a normalized position based on the first inputs. The normalized position can be determined according to Operation 1, where PS # A is an atmospheric pressure provided by the sensor 122.a, PS # B is an atmospheric pressure provided by the sensor 122.b, and NP is a normalized position of the moving object 110.

$$NP=f(PS\ \#B, PS\ \#A) \qquad \text{Operation 1}$$

In accordance with one embodiment, the normalized position is the difference between the atmospheric pressure PS # A and the atmospheric pressure PS # B (e.g., PS # B−PS # A), such external disturbances or influences (e.g., weather) are removed from the corrected velocity determination at block 220. In accordance with one or more embodiments, the determination of the normalized position can also include temperature and/or humidity provided by additional sensors within the electronic speed detection system 100. For instance, as temperature and humidity can affect atmospheric pressure, the electronic speed detection system 100 can subtract out the temperature and humidity readings to determine improved atmospheric pressure readings. The normalized position can also be stored on a memory for access by subsequent operations and components of the electronic speed detection system 100.

At block 215, the controller 130 receives a second input from an accelerometer (e.g., sensors 121). The second input comprise sensor signals indicating the acceleration of the moving object 110 as it traverses vertically within a hoistway of the common pressure environment 101.

At block 220, the controller 130 determines a corrected velocity based on the second input and the normalized position. The corrected velocity can be determined according to Operation 2, where A is an acceleration provided by the sensor 121, NP is the normalized position determined in Operation 1, and CV is a corrected velocity of the moving object 110. Operation 2 can be an approximate as a linear or log function $f(\ )$. Note that the velocity calculation can also depend on the time history of acceleration and pressure. In accordance with one or more embodiments, the controller 130 can include, can be, or can be connected to a proportional-integral-derivative (PID) controller. The PID controller can be a control loop feedback mechanism that automatically/continuously implements the Operation 2 to calculate a value (e.g., the corrected velocity) by utilizing defined constants. The constants can comprise a first constant defined by the sensor signals used to determine the normalized position (e.g., NP determined by the controller in the Operation 1) and a second constant defined by a sensor signal from the sensor 122 (e.g., A provided by an accelerometer).

$$CV=f(A,NP) \qquad \text{Operation 2}$$

At block 225, the controller 130 applies the corrected velocity to the moving object 101. For example, the corrected velocity is outputted by the controller 130 with minimal margin of error. By outputting the corrected velocity, the controller 130 can monitor a potential for over speed by the moving object 110 by comparing an expected speed (stored in the memory 134) to the corrected velocity. Any difference between the expected speeds to the corrected velocity can be utilize for safety monitoring and/or can act as a redundant monitoring of speed to meet a function of a governor.

Figure 3:
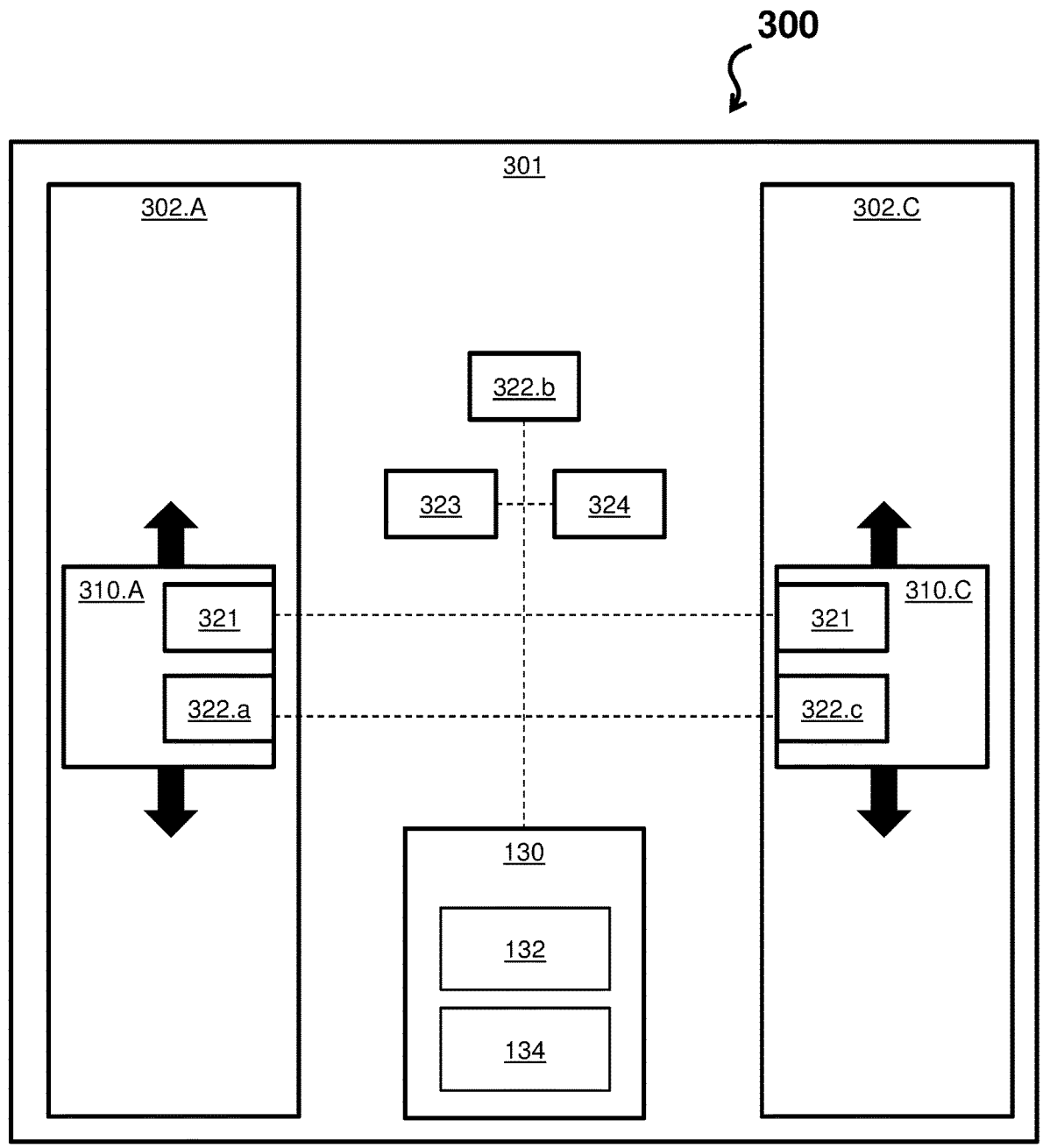
FIG. 3 depicts an electronic speed detection system in accordance with one or more embodiments.

Turning now to FIG. 3, an electronic speed detection system 300 is depicted in accordance with one or more embodiments. The electronic speed detection system 300 can comprise a building 301, hoist ways 302 (e.g., 302.A and 302.C), elevators 310 (e.g., 310.A and 310.C), a plurality of accelerometers 321, a plurality of pressure sensors 322 (e.g., 322.a, 322.b, and 322.c), at least one thermometer 323, at least one hygrometer 324, and a controller 330 comprising a processor 332, and a memory 334. Note that each item of FIG. 1 can be representative of one or more of that item and items that are similar to items of FIG. 1 are not reintroduced herein.

The electronic speed detection system 300 of FIG. 3 depicts the plurality of pressure sensors 322 provided multiple atmospheric pressure readings with respect multiple sensor locations. Further, the electronic speed detection system 300 of FIG. 3 depicts the at least thermometer 323 and the at least one hygrometer 324 providing temperature and humidity readings, respectively. Each of these readings can be utilized to more accurately generate a corrected velocity using the vertical position to correct for an accelerometer offset (e.g., of the plurality of accelerometers 321). For instance, as temperature and humidity can affect atmospheric pressure, the electronic speed detection system 300 can subtract out the temperature and humidity readings to determine improved atmospheric pressure readings.

Technical effects and benefits of embodiments herein can include an electronic speed detection system that utilizes atmospheric pressure and gravity to eliminate additional mechanical parts and provide low cost, reliable speed solution offering more functionality than the contemporary elevator systems.

Embodiments herein can include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments herein.

Aspects of the embodiments herein are described herein with reference to flowchart illustrations and/or block diagrams of methods, apparatus (systems), and computer program products according to embodiments herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electronic speed detection system comprising:
   an accelerometer coupled to a moving object;
   a hybrid altimeter comprising a first pressure sensor coupled to the moving object and a second pressure sensor; and
   a controller comprising a memory and a processor, the memory storing computer program instructions executable by the processor to cause the electronic speed detection system to:
      determine a normalized position based on first inputs received from the hybrid altimeter;
      determine a corrected velocity based on a second input received from the accelerometer and the normalized position; and
      cause the electronic speed detection system to apply the corrected velocity to the moving object to monitor a potential for over speed by the moving object by comparing an expected speed to the corrected velocity and to correct for an accelerometer offset of the accelerometer.

2. The electronic speed detection system of claim 1, wherein the first inputs comprise first and second atmospheric pressures detected by the first and second pressure sensors, respectively, and provided as sensor signals by the first and second pressure sensors to the controller.

3. The electronic speed detection system of claim 2, wherein the normalized position is determined by the controller according to NP=$f$(PS # B, PS # A), where PS # A is the first atmospheric pressure provided by the first pressure sensor, PS # B is the second atmospheric pressure provided by the second pressure sensor, and NP is the normalized position of the moving object.

4. The electronic speed detection system of claim 2, wherein the normalized position is determined based on the difference between the first and second atmospheric pressures to remove disturbances or influences external to the moving object.

5. The electronic speed detection system of claim 1, wherein the second pressure sensor is located at a fixed location within a hoistway of the moving object.

6. The electronic speed detection system of claim 1, wherein the second input comprises an acceleration of the moving object detected by the accelerometer and provided as a sensor signal by the accelerometer to the controller.

7. The electronic speed detection system of claim 6, wherein the corrected velocity is determined by the controller according to CV=$f$(A, NP), where A is the acceleration, NP is the normalized position, and CV is the corrected velocity of the moving object.

8. The electronic speed detection system of claim 1, wherein the hybrid altimeter comprises a plurality of second pressure sensors, each of the plurality of second pressure sensors is located at a separate fixed location within a hoistway of the moving object, and each of the plurality of second pressure sensors provides atmospheric pressures corresponding to those separate fixed locations.

9. A computer-implemented method for electronic speed detection of a moving object, the computer-implemented method comprising:
   determining, by a controller comprising a memory and a processor, a normalized position based on first inputs received from a hybrid altimeter comprising a first pressure sensor coupled to the moving object and a second pressure sensor;
   determining, by the controller, a corrected velocity based on a second input received from an accelerometer coupled to the moving object and the normalized position; and
   applying the corrected velocity to the moving object to monitor a potential for over speed by the moving object by comparing an expected speed to the corrected velocity and to correct for an accelerometer offset of the accelerometer.

10. The computer-implemented method of claim 9, wherein the first inputs comprise first and second atmospheric pressures detected by the first and second pressure sensors, respectively, and provided as sensor signals by the first and second pressure sensors to the controller.

11. The computer-implemented method of claim 10, wherein the normalized position is determined by the controller according to NP=$f$(PS # B, PS # A), where PS # A is the first atmospheric pressure provided by the first pressure sensor, PS # B is the second atmospheric pressure provided by the second pressure sensor, and NP is the normalized position of the moving object.

12. The computer-implemented method of claim 10, wherein the normalized position is determined based on the difference between the first and second atmospheric pressures to remove disturbances or influences external to the moving object.

13. The computer-implemented method of claim 9, wherein the second pressure sensor is located at a fixed location within a hoistway of the moving object.

14. The computer-implemented method of claim 9, wherein the second input comprises an acceleration of the moving object detected by the accelerometer and provided as a sensor signal by the accelerometer to the controller.

15. The computer-implemented method of claim 14, wherein the corrected velocity is determined by the controller according to CV=$f$(A, NP), where A is the acceleration, NP is the normalized position, and CV is the corrected velocity of the moving object.

16. The computer-implemented method of claim 9, wherein the hybrid altimeter comprises a plurality of second pressure sensors, each of the plurality of second pressure sensors is located at a separate fixed location within a hoistway of the moving object, and each of the plurality of second pressure sensors provides atmospheric pressures corresponding to those separate fixed locations.

* * * * *